Nov. 11, 1930.    S. TOTH    1,780,955
DISK PLOW
Filed Sept. 17, 1929    2 Sheets-Sheet 1

Inventor
Steven Toth
Attorney

Nov. 11, 1930.  S. TOTH  1,780,955
DISK PLOW
Filed Sept. 17, 1929    2 Sheets-Sheet 2
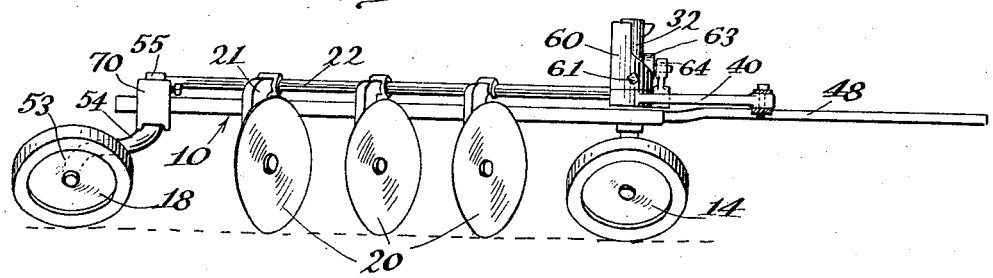
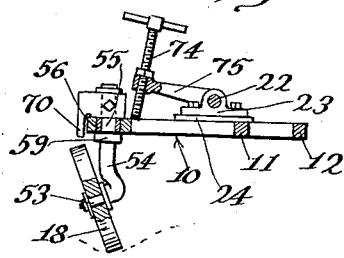

Patented Nov. 11, 1930

1,780,955

UNITED STATES PATENT OFFICE

STEVEN TOTH, OF PERRIS, CALIFORNIA

DISK PLOW

Application filed September 17, 1929. Serial No. 393,219.

This invention relates generally to agricultural implements more specifically to a disk plow or furrow.

The object of this invention is to provide an implement of the character referred to constructed in such a manner that the cultivating tools will be automatically raised from the ground during turning movement, thereby permitting a short radius or right angle turn.

Other objects and advantages will be apparent from the following description, reference being had to the accompanying drawings, in which:

Fig. 3 is a side elevation;

Fig. 4 is a sectional view taken on line 4—4 of Fig. 1 in the direction indicated by the arrows;

Fig. 5 is a sectional view taken on line 5—5 of Fig. 2 showing the disks in raised position;

Fig. 6 is a sectional view taken on line 6—6 of Fig. 1 showing the depth adjusting means;

Fig. 7 is a sectional view taken on line 7—7 of Fig. 1 showing the disk mounting;

Fig. 8 is a view similar to Fig. 4 showing the cultivating tools in a raised position;

Fig. 9 is a fragmentary side elevation showing plows substituted for the disks.

Figure 1:
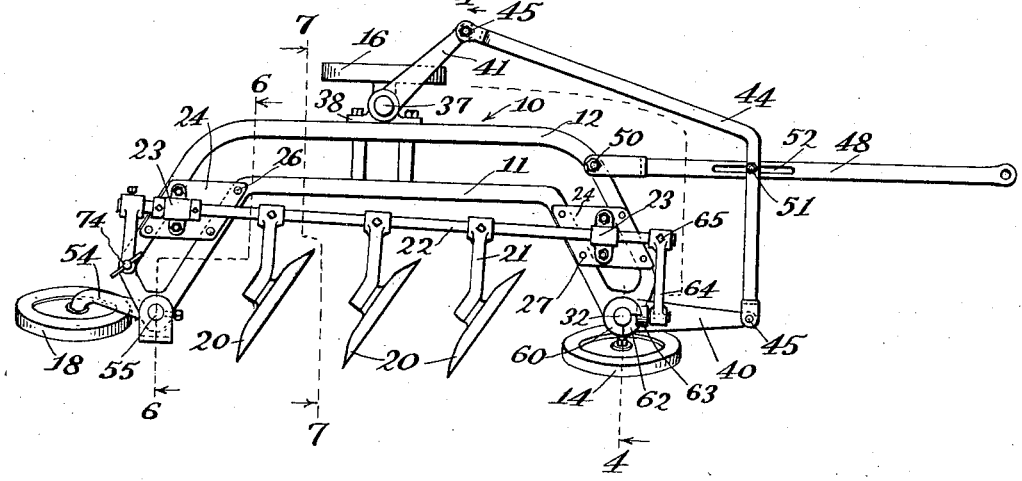
Fig. 1 is a top plan view of the disk plow showing the parts as they appear in working position.

Referring more specifically to the drawings, 10 designates the frame consisting of bars 11 and 12 carried by guide wheels 14 and 16 respectively, and a trailer wheel 18. Cultivating tools 20, such as furrowing disks are secured to arms 21 carried by a shaft 22 rotatably mounted in bearings 23 on plates 24 secured to the frame 10 at each end thereof as designated at 26 and 27.

The forward guide wheel 14 is mounted on an axle 30 formed on a member 31 having a pintle 32 extending through a bearing 33 in the frame. In a similar manner the guide wheel 16 is mounted on an axle 34 formed integral with a member 36 which is provided with a pintle 37 mounted in a bearing 38 secured to the bar 12 of the frame and extending upwardly therefrom.

Levers 40 and 41 respectively are mounted on and secured to the pintles 32 and 37 by keys or set screws, the outer ends of which are connected to a bar 44 by pins 45.

The implement is adapted to be drawn by a tractor or other pulling means through a tongue 48 connected to the frame 10 by clevis 49 and bolt 50, the bar being also connected to the tongue by a pin 51 passing through an opening in the bar and a slot 52 in the tongue, it being understood that the tongue is adapted to be connected to the draw bar of a tractor.

The trailer wheel 18 is mounted on an axle 53 projecting from a member 54 having a pintle 55 extending through a bearing 56 in the frame 10, each of the members 31, 36 and 54 having collars designated at 57, 58 and 59 respectively upon which the frame 10 rests.

An important feature of the invention resides in means for lifting the cultivating tools out of the ground or furrow in order to make a turn without stopping or manually operating the usual trip devices. This is accomplished by a cam 60 secured to the upper end of the pintle 32 by a set screw 61, the cam having an inclined face 62 engaged by a roller 63 mounted on an arm 64 secured to the shaft 22 by a set screw 65.

Figure 2:
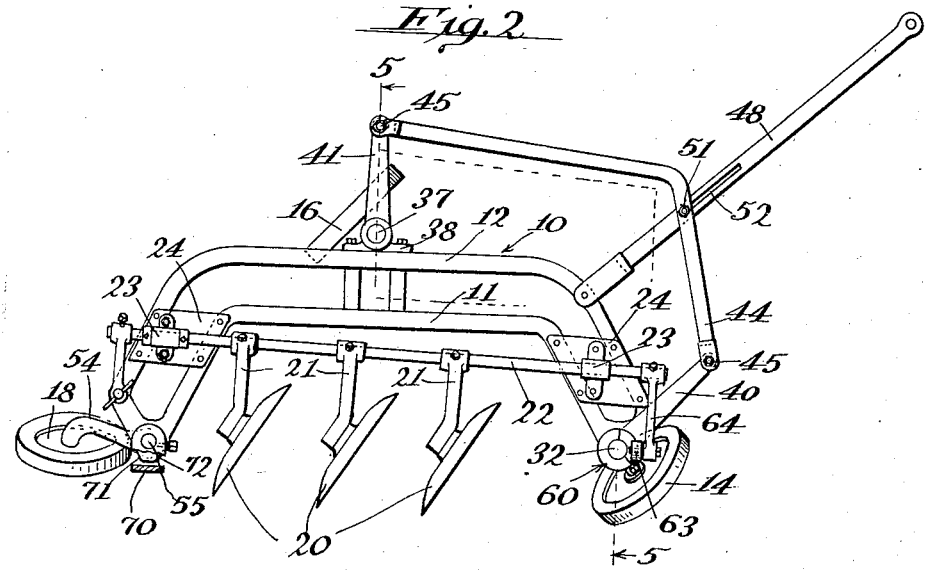
Fig. 2 is a top plan view showing the position of the parts assembled while making a turn.

When making a turn the guide wheels move from the position shown in Fig. 1 to that shown in Fig. 2 due to movement of the tongue 48 through the bar 44 and levers 40 and 41. During movement of the guide wheels the shaft 22 will be rocked due to movement of the cam 60, the inclined face 62 lifting the roller 63, thereby raising the disks as shown in Fig. 5.

From the foregoing it will be seen that the disks are automatically raised prior to making a turn, thereby enabling the implement to make a short radius turn, practically at a right angle if desired.

Swivelling movement of the trailer wheel is limited by a plate 70 secured to the pintle 55 and adapted to engage faces 71 and 72 on the frame adjacent the bearings 56.

The cutting depth of tools is regulated by a jack screw 74 threaded to an arm 75 secured to the shaft 22 and engaging the frame 10. By loosening the set screw 65 on the arm 69 then manipulating the screw 74 the position of the disks may be adjusted.

When moving the implement from one field to another, or over roads the disks may be held in raised position by withdrawing the roller from the cam when the parts are in turning position, then letting it rest on the outer face of the cam after returning to running position as shown in Fig. 8.

Plows designated at 80 may be substituted in place of the disks as shown in Fig. 9, the construction and operation being the same as above described.

Thus it will be seen that the implement of this invention is comparatively simple in construction, the operation of which is automatic viz. lifting the tools from the ground prior to and while making a turn, thereby requiring no manipulation on the part of the operator.

I claim:

1. An implement of the character stated comprising a frame, wheels supporting said frame, cultivating tools carried by said frame, and cam means for raising said cultivating tools, said means automatically operated by turning movement of said wheels.

2. An implement of the character stated comprising a frame, guide wheels supporting the forward and intermediate portion of said frame, a trailer wheel supporting the rear end of said frame, a shaft rotatably mounted on said frame, cultivating tools connected to said shaft, and means operated by turning movement of said guide wheels for rocking said shaft, thereby raising said cultivating tools to permit turning movement of the implement.

3. An implement of the character described comprising a frame, a pair of guide wheels supporting the forward and intermediate portion of said frame, a trailer wheel supporting the rear end of said frame, a shaft extending lengthwise of said frame and rotatably mounted thereon, a plurality of cultivating tools carried by said shaft, and means for automatically lifting said cultivating tools upon turning movement of said pair of guide wheels.

4. An implement of the character described comprising a frame, a shaft rotatably mounted on said frame, a plurality of arms secured to said shaft, cultivating tools connected to said arms, a member having a pintle extending through a bearing in the forward end of said frame, a guide wheel mounted on an axle projecting from said member, a cam secured to the pintle of said member, an arm secured to said shaft and having a roller engaging said cam, a second member having a pintle mounted in a bearing secured to said frame, a second guide wheel mounted on an axle projecting from said second member, levers secured to the pintles of said first and second members, a tongue pivotally connected to said frame, and a bar connected to said levers whereby movement of said tongue will simultaneously turn said guide wheels and actuate said cam, thereby transmitting rocking movement to said shaft and lifting said cultivating tools.

In testimony whereof I affix my signature.

STEVEN TOTH.